Figures 1, 2:
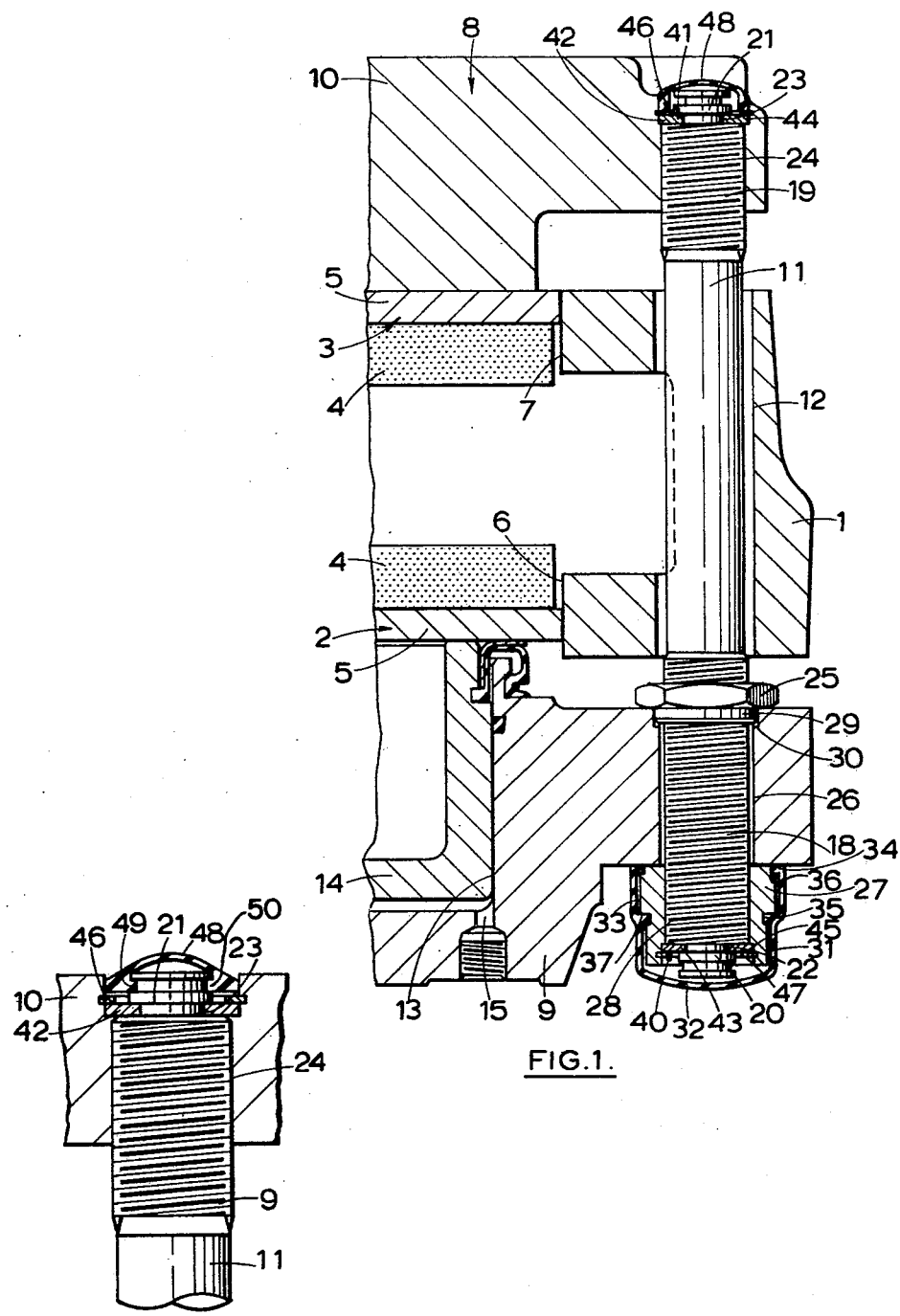

United States Patent [19]

Margetts et al.

[11] 4,121,700
[45] Oct. 24, 1978

[54] DISC BRAKES FOR VEHICLES

[75] Inventors: Hugh Grenville Margetts, Leamington Spa; Peter Charles Knight, Birmingham, both of England

[73] Assignee: Girling Limited, Birmingham, England

[21] Appl. No.: 808,958

[22] Filed: Jun. 22, 1977

[30] Foreign Application Priority Data

Sep. 3, 1976 [GB] United Kingdom .............. 36561/76

[51] Int. Cl.² .......................................... F16D 55/224
[52] U.S. Cl. ...................................... 188/73.4; 85/8.8; 85/35; 151/28
[58] Field of Search ...................... 188/71.1, 72.4, 72.5, 188/72.6, 73.3, 73.4; 85/8.6, 8.7, 8.8, 8.9, 35; 151/5, 28, 29; 220/DIG. 9, 306, 307

[56] References Cited

U.S. PATENT DOCUMENTS

| 508,177 | 11/1893 | Lusk | 151/28 |
|---|---|---|---|
| 1,328,399 | 1/1920 | Reddy | 151/28 |
| 1,410,605 | 3/1922 | Schacht | 220/DIG. 19 |
| 2,784,811 | 3/1957 | Butler | 188/73.4 |
| 3,548,704 | 12/1970 | Kutryk | 85/35 X |
| 3,656,590 | 4/1972 | Newstead | 188/73.4 |
| 3,976,169 | 8/1976 | Ogawa | 188/73.3 |
| 4,051,925 | 10/1977 | Knight | 188/73.4 |

FOREIGN PATENT DOCUMENTS

| 2,306,371 | 10/1976 | France | 188/73.3 |
|---|---|---|---|
| 1,079,911 | 8/1967 | United Kingdom | 188/73.3 |

*Primary Examiner*—George E. A. Halvosa
*Attorney, Agent, or Firm*—Scrivener, Parker, Scrivener & Clarke

[57] ABSTRACT

In a disc brake of the kind in which the clamping member straddling the disc consists of pressure plates located on opposite sides of the disc and interconnected at their outermost ends by draw-bars, each draw-bar is provided at one end with a threaded portion and the threaded portions are passed through spaced clearance bores in the pressure plate to which those ends of the draw-bars are to be connected. The pressure plate is clamped between pairs of axially spaced nuts screwed onto the threaded portions.

14 Claims, 2 Drawing Figures

DISC BRAKES FOR VEHICLES

SPECIFIC DESCRIPTION

This invention relates to improvements in disc brakes for vehicles of the kind in which a first friction pad assembly is adapted to be urged directly into engagement with one face of a rotatable disc by actuating means, and a second friction pad assembly is adapted to be applied indirectly to the opposite face of the disc by the reaction of the actuating means which is applied to the second friction pad assembly through a clamping member straddling a portion of the periphery of the disc and movable axially with respect to a relatively stationary carrier member, the clamping member comprising a yoke assembly consisting of a pair of pressure plates which are chordal to the disc and are located on opposite sides thereof, and circumferentially spaced draw-bars which interconnect the pressure plates at their outermost ends and determine the axial spacing between the pressure plates.

In our British Patent specification No. 1,193,641 a disc brake of the kind set forth is described, in which each draw bar is provided at one end with a threaded portion onto which an open-ended nut is screwed. Spherical joints are interposed between the draw-bars and the pressure plates. The working length of each bar is, in this case, individually adjusted and locked by means of lock nuts. By providing abutting, and therefore relatively rotatable lock nuts makes it difficult to incorporate a sealing boot to protect that end of the draw-bar which will not be damaged when the brake is to be disassembled. Also when the threaded portion of each draw-bar passes with a clearance through a bore in one pressure plate, some tilting movement of the draw-bar relative to the pressure plate may occur. Indeed in some of the embodiments this is positively permitted by the provision of partspherical washers. This results in relative pivotal movement of the pressure plates which may be undesirable. Also the draw-bar and pressure plate may move bodily relatively to each other, which makes for indeterminancy as to the positions of the parts. This necessitates the provision of increased clearance in such constructions to allow for the movement. Of course, such relative movement might be avoided by providing the draw-bars with bearing portions which are tight fits in the pressure plate, but this places unnecessary manufacturing tolerances on the parts and creates difficulties in removing the pressure plates, when the brake is to be disassembled.

According to our invention in a disc brake of the kind set forth for a vehicle at least one end of each draw-bar is provided with a threaded portion and the threaded portions are passed through spaced clearance bores in the pressure plate to which those ends of the draw-bars are to be connected, the pressure plate being clamped between pairs of axially spaced nuts screwed onto the threaded portions.

By clamping the pressure plates between the nuts has the advantage that the draw-bars are restrained against tilting with respect to the pressure plate. By providing pairs of separate nuts facilitates installation and enables the outer nuts at the outermost ends of the draw-bars to be enclosed within flexible sealing boots to protect the free end of the draw bars. Since the nuts are clamped tightly against the pressure plate, the inner ends of the threaded portions are also effectively sealed against the ingress of dirt or foreign bodies.

To disassemble the brake, the inner nuts are first slackened to relieve the clamping force Thereafter the sealing boots can be removed in undamaged condition to expose the outer nuts.

Where a releasable coupling also provided between the free end of each draw-bar and each outer nut comprises an abutment member releasably retained in a groove defined in the nut and engaged within a groove in the draw-bar located between the screw-threaded portion and an end portion at the free end of the draw-bar, initial release of the inner nuts also relieves the clamping force acting on the abutment members, which can easily be removed after removal of the sealing boots, to permit subsequent removal of the outer nuts.

Preferably each boot is provided at an intermediate point in the length of its skirt with an inwardly directed radial flange or bead which is detachably received in a complementary groove in the outer surface of the nut. Alternatively, or in addition, an annular groove is defined between the nut and the pressure plate which it engages to receive an inwardly directed flange or bead at the free end of the skirt. Conveniently the said annular groove is provided in the inner end face of the nut itself.

The opposite end of each draw-bar may also be provided with a screw-threaded portion which is screwed into a threaded bore in the other pressure plate with a releasable coupling provided between each said opposite end and the pressure plate. When each releasable coupling comprises an abutment member releasably retained in a groove in the pressure plate and engaged with a groove in the draw-bar located between the screw-threaded portion and a head of reduced diameter extending outwardly from the threaded portion, the head is increased in length to accommodate a second groove spaced outwardly from the first, and a resilient closure received in the open end of the bore is provided with a radial flange or bead which is received in the second groove to retain the closure in position.

One embodiment of our invention and a modification are illustrated in the accompanying drawings in which:

FIG. 1 is a section through substantially one circumferential half of a disc brake; and FIG. 2 is a section at one end of the draw-bar incorporated in the brake of FIG. 1 but showing a modified construction.

The disc brake for vehicles illustrated in the accompanying drawings comprises a carrier member 1 of generally U-shaped outline which straddles the peripheral edge of a disc (not shown) and is mounted on a stationary part adjacent to one face of the disc.

Friction pad assemblies 2, 3 for engagement with opposite faces of the disc are guided for movement towards and away from the disc in the stationary member 1. Each friction pad assembly 2, 3 comprises a pad 4 of friction material for engagement with the disc, and a rigid backing plate 5 carrying the pad 4 and having end edges slidably engaged with drag-taking abutment surfaces 6, 7 in the carrier member 1.

A clamping member 8 comprising a yoke assembly fitting over the disc comprises a pair of pressure plates in the form of an actuating beam 9 and a reaction beam 10 which are chordal with respect to the disc, and a pair of circumferentially spaced circular draw-bars of which only one is shown at 11 and which extend through clearance openings 12 in carrier member 1. The draw-bars 11 interconnect the pressure plates 9 and 10 at their outermost ends.

The actuator beam 9 is provided with a pair of hydraulic cylinders of which one is shown at 13, and an hydraulic piston 14 working in each cylinder acts on the friction pad assembly 2 to apply it directly to the disc when the cylinder 13 is pressurised through a passage 15. The reaction urges the actuating beam in the opposite direction in turn acting through the draw-bars 11 to apply the pad assembly 3 to the opposite face of the disc through the reaction beam 10.

The drag on the friction pad assemblies 2 and 3 when the brake is applied is taken by the surfaces 6, 7.

Each draw-bar 11 is provided at opposite ends with threaded portions 18 and 19, each terminating in an end portion or head 20, 21 of reduced diameter between which and the threaded portion 18, 19 is provided a radial groove 22, 23.

Each threaded portion 19 is screwed into an open-ended threaded bore 24 in the reaction beam 10. The threaded portion 19 at the opposite end of each draw-bar is screwed through a nut 25 and then projects through a clearance bore 26 in the actuating beam 9 to receive a nut 27 having an open-ended threaded bore 28. The actuating beam 9 is therefore clamped at opposite ends between the nuts 25 and 27 of two circumferentially spaced pairs.

The nut 25 is formed integrally at one end with a tubular boss 29 which is a close fit in a counterbore 30 at the adjacent end of the clearance bore 26. During assembly the nut 25 is fed down the threaded portion 18 of the draw-bar 11 to the pressure plate 9. When the nut 27 has been secured in position the nut 25 is screwed towards the pressure plate 9 to cause the boss 29 to enter the counterbore 30, and is tightened to clamp the draw-bar 11 to the pressure plate 9.

The nut 27 is enclosed within a flexible sealing boot 31 of cup-shaped outline having a closed crown 32 which encloses the head 20, and an annular skirt 33 surrounding the nut 27 and provided at its free end and at an intermediate point in its length with inwardly directed continuous radial beads or flanges 34 and 35 respectively. The head 34 is received in a complementary groove 36 comprising an undercut in the face of the nut 27 which abuts the pressure plate 9, and the bead 35 is received in a complementary groove 37 in the external surface of the nut 27.

A releasable coupling 40, 41 is provided between each end of the draw-bar 11 and the nut 27 and the reaction beam 10 respectively. As illustrated each coupling comprises an abutment member comprising a washer 42, 43 of generally "C" outline which is of substantially the same thickness as the groove 23, 22 in which it is received. The washer 42, 43 is of an external diameter greater than that of the draw-bar 11 and is received in a groove in a counterbore 44, 45 in the outer end of the bore 27, 24, one face of the groove defined by a shoulder at the step at the change in diameter, and the opposite face of the groove comprising a circlip 46, 47 releasably located in circlip grooves in the counterbore 44 respectively 45. The washers 42, 43 can be released from the counterbores by removing the circlips 46, 47.

In assembling the brake each draw-bar 11 is first screwed through the bore 24 until the groove 23 projects from the reaction beam 10 by a distance sufficient to receive the washer 42. The draw-bar is then screwed in the opposite direction until the washer 31 engages with the stop face whereafter the circlip 46 is inserted to retain the washer 42 in position, determining a relative axial position for the draw-bar and locking the bar against rotation relative to the reaction beam 10.

The opposite end of each draw-bar which projects from the nut 25 is then inserted through the bores 12 and 26 and the nut 27 is screwed onto the threaded portion 18 as described above until the groove 23 projects from the nut 27 to receive the washer 42. Thereafter the nut 26 is screwed back in the opposite direction to clamp the washer 43 against the stop face whereafter the circlip is inserted to retain the washer 43 in position, determining an axial position of the draw-bar with respect to the nut 27 and locking the draw-bar and the nut 27 against relative rotation. The flexible sealing boot 31 is then fitted over the nut 27, and the nut 25 is finally tightened as described above.

The axial distance between the grooves 22 and 23 and the location of the stop faces in the reaction beam 10 and the nut 27 determine the effective or set length of the draw bars 11.

By clamping the boss 29 into the counterbore 30 and by providing the sealing boot 31 ensures that the length of the screw-threaded portion 18 between the nuts 25 and 27 and the circlip 47 and the washer 43 are protected from the ingress of dirt and other foreign matter which could otherwise affect maintenance and disassembly of the brake.

The threads of the portion 19, the circlip 46 and the washer 42 are similarly protected by means of a resilient plug 48 which fits into the counterbore in the pressure plate 10 and encloses the head 21.

In the modified construction illustrated in FIG. 2 the head 21 is extended in length to include a groove 49 which receives an inwardly directed radial bead 50 on the plug 48.

We claim:

1. A disc brake comprising first and second friction pad assemblies for engagement with opposite faces of a rotatable disc, a relatively stationary carrier member, actuating means for urging said first friction pad assembly directly into engagement with a first face of said disc, a clamping member straddling a portion of the periphery of said disc, said clamping member comprising first and second pressure plates which are chordal to said disc and are located on opposite sides thereof with said first pressure plate located adjacent to said first friction pad assembly, said second pressure plate acting on said second friction pad assembly, and circumferentially spaced draw-bars which interconnect said pressure plates at the outermost ends thereof and determine the axial spacing between said pressure plates, the reaction of said actuating means acting indirectly on said second friction pad assembly through said second pressure plate such that said second friction pad assembly is applied to a second face of said disc opposite said first face, at least one of said draw-bars having first and second opposite ends of which said first end includes a threaded portion and one of said pressure plates has a clearance bore through which said threaded portion is passed, and a pair of axially spaced inner and outer nuts are both axially adjustably screwed onto said threaded portion on opposite sides of said one pressure plate and between which said one pressure plate is clamped.

2. A disc brake as claimed in claim 1, wherein each of said draw-bars has first and second opposite ends with each said first end provided with a threaded portion and said one pressure plate is provided with spaced clearance bores through which said threaded portions are passed, a pair of axially spaced inner and outer nuts being secured onto each said threaded portion on opposite sides of said one pressure plate and between which said one pressure plate is clamped.

3. A disc brake as claimed in claim 1, wherein said bore is provided adjacent to said inner nut with a counterbore, and said inner nut is provided with an axially extending boss which is urged into said counterbore, a flexible sealing boot being provided for enclosing said outer nut and the free end of said threaded portion.

4. A disc brake as claimed in claim 3, wherein said boot has a skirt which encircles said outer nut and said nut has an annular groove in the outer surface thereof, at least one radial flange on said skirt being detachably received in said groove.

5. A disc brake as claimed in claim 4, wherein said flange is located at an intermediate point in the axial length of said skirt.

6. A disc brake as claimed in claim 4, wherein said flange is located at the free end of said skirt, and said groove is located in an inner end face of the nut adjacent to said one pressure plate, being defined between said outer nut and said one pressure plate.

7. A disc brake as claimed in claim 3, wherein said boot has a skirt which encircles said outer nut, and said nut is provided in the outer surface thereof with two axially spaced grooves, two axially spaced radial flanges on said skirt located respectively at an intermediate point in the axial length of, and at the free end of, the skirt being received in said grooves.

8. A disc brake as claimed in claim 1, wherein said first end of said draw-bar has an end portion, a groove is defined in said draw-bar between said screw-threaded portion and said end portion, said outer nut incorporates an internal groove, and a releasable coupling is provided between said first end of said draw-bar and said outer nut, said coupling comprising an abutment member releasably retained in said groove in said outer nut and engaged within said groove in said draw-bar.

9. A disc brake as claimed in claim 1, wherein said second end of said draw-bar is also provided with a second screw-threaded portion which is screwed into a threaded bore in the other of said pressure plates and a releasable coupling is provided between said second end and said pressure plate.

10. a disc brake as claimed in claim 9, wherein a resilient closure is located in an open outer end of the said bore in the said other pressure plate.

11. A disc brake as claimed in claim 9, wherein said second end of said draw-bar has a second end portion of reduced diameter defining a head, a first groove is defined in said draw-bar between said second screw-threaded portion and said head the said other pressure plate incorporates an internal groove, and a releasable coupling is provided between said second end of said draw-bar and said other pressure plate, said coupling comprising an abutment member releasably retained in said groove in said other pressure plate and engaged within said groove in said draw-bar.

12. A disc brake as claimed in claim 11, wherein said head is increased in length to accommodate a second groove spaced outwardly from said first groove, and a resilient closure received in open end of said threaded bore is provided with a radial flange which is received in said second groove to retain said closure in position.

13. A disc brake comprising first and second friction pad assemblies for engagement with opposite faces of a rotatable disc, a relatively stationary carrier member, actuating means for urging said first friction pad assembly directly into engagement with a first face of said disc, a clamping member straddling a portion of the periphery of said disc, said clamping member comprising first and second pressure plates which are chordal to said disc and are located on opposite sides thereof with said first pressure plate located adjacent to said first friction pad assembly, said second pressure plate acting on said second friction pad assembly, and circumferentially spaced draw-bars which interconnect said pressure plates at the outermost ends thereof and determine the axial spacing between said pressure plates, the reaction of said actuating means acting indirectly on said second friction pad assembly through said second pressure plate such that said second friction pad assembly is applied to a second face of said disc opposite said first face, at least one of said draw-bars having first and second opposite ends of which said first end includes a threaded portion and one of said pressure plates has a clearance bore through which said threaded portion is passed, and a pair of axially spaced inner and outer nuts are both axially adjustably screwed onto said threaded portion on opposite sides of said one pressure plate and between which said one pressure plate is clamped, wherein said first end of said draw-bar has an end portion, a groove is defined in said draw-bar between said screw-threaded portion and said end portion, said outer nut incorporates an internal groove, and a releasable coupling is provided between said first end of said draw-bar and said outer nut, said coupling comprising an abutment member releasably retained in said groove in said outer nut and engaged within said groove in said draw-bar.

14. A disc brake as claimed in claim 1, wherein said bore is provided adjacent to said inner nut with a counterbore, and said inner nut is provided with an axially extending boss which is urged into said counterbore, a flexible sealing boot being provided for enclosing said outer nut and the free end of said threaded portion.

* * * * *